(12) United States Patent
Konik et al.

(10) Patent No.: US 9,208,234 B2
(45) Date of Patent: *Dec. 8, 2015

(54) DATABASE ROW ACCESS CONTROL

(71) Applicant: International Business Machines Corporation, Armonk, NY (US)

(72) Inventors: Rafal P. Konik, Oronoco, MN (US); Roger A. Mittelstadt, Byron, MN (US); Brian R. Muras, Rochester, MN (US); Mark W. Theuer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 156 days.

This patent is subject to a terminal disclaimer.

(21) Appl. No.: 13/776,128

(22) Filed: Feb. 25, 2013

(65) Prior Publication Data

US 2014/0149387 A1 May 29, 2014

Related U.S. Application Data

(63) Continuation of application No. 13/687,538, filed on Nov. 28, 2012, now Pat. No. 9,069,817.

(51) Int. Cl.
*G06F 17/30* (2006.01)

(52) U.S. Cl.
CPC .... *G06F 17/30864* (2013.01); *G06F 17/30286* (2013.01); *G06F 17/30324* (2013.01); *G06F 17/30442* (2013.01)

(58) Field of Classification Search
CPC .................. G06F 17/30221; G06F 17/30088; G06F 17/30174
USPC ......................................... 707/713, 785, 803
See application file for complete search history.

(56) References Cited

U.S. PATENT DOCUMENTS

| 4,829,427 | A | 5/1989 | Green |
| 6,253,251 | B1 * | 6/2001 | Benantar et al. ............ 719/315 |
| 6,654,039 | B1 | 11/2003 | Hollines, III et al. |
| 7,007,009 | B2 | 2/2006 | Bestgen et al. |
| 7,240,046 | B2 | 7/2007 | Cotner et al. |
| 7,720,858 | B2 | 5/2010 | Dettinger et al. |
| 7,734,620 | B2 * | 6/2010 | Muras et al. ................. 707/718 |
| 2006/0195449 | A1 | 8/2006 | Hunter et al. |

(Continued)

OTHER PUBLICATIONS

Camillone et al., "Compatability of Access Control Lists and Permission Bits in AIXv3", IP.Com Prior Art Database, IP.Com No. IPCOM000122576D, Electronic Publication Apr. 4, 2005, (Original Publication Dec. 1, 1991, IBM Technical Disclosure Bulletin, vol. 34, No. 7B), pp. 127-129.

IBM, "Permission Augmentation in an Access Control System", IP.Com Prior Art Database, IP.Com No. IPCOM000180424D, Published Mar. 9, 2009, pp. 1-3.

(Continued)

*Primary Examiner* — Jean M Corrielus
*Assistant Examiner* — Andalib Lodhi
(74) *Attorney, Agent, or Firm* — Penny L. Lowry; James R. Nock

(57) ABSTRACT

A method, system, and computer program product to create an access control bit mapping (ACBM) structure for a corresponding database table are disclosed. The ACBM structure may include a relative record number (RRN) bit map. The RRN bit map may describe the access rights for a parameter. The computer-implemented method may maintain one or more statistics describing the RRN bit map. The method may additionally provide for updating the ACBM structure. The method may also provide for using the ACBM structure to process a database query.

19 Claims, 9 Drawing Sheets

(56) References Cited

U.S. PATENT DOCUMENTS

| | | |
|---|---|---|
| 2008/0168227 A1* | 7/2008 | Yagisawa et al. ............. 711/114 |
| 2009/0049241 A1* | 2/2009 | Ohno et al. ................... 711/114 |
| 2011/0218999 A1* | 9/2011 | Kan et al. ...................... 707/737 |
| 2012/0030242 A1* | 2/2012 | Nakamura et al. ............ 707/781 |
| 2012/0278426 A1* | 11/2012 | Nakagawa et al. ........... 709/217 |

OTHER PUBLICATIONS

Wideman, G., "Microsoft Access Permissions Explorer", Grahamwideman.com, Published Sep. 18, 2005 (Original Publication Sep. 1, 2005), pp. 1-7. http://www.grahamwideman.com/gw/tech/access/permexpl/index.htm.

* cited by examiner

| PARAMETER PERMISSION | RUNTIME PARAMETER | DATA VALUE |
|---|---|---|
| D54 PERMISSION | MGR_D54 | D54 |
| D55 PERMISSION | MGR_D55 | D55 |
| DHR PERMISSION | HR_DIR | != D56 |

| EMP ID | EMP FNAME | EMP LNAME | START DATE | PARAMETER |
|---|---|---|---|---|
| 1 | ... | ... | ... | D54 |
| 2 | ... | ... | ... | D55 |
| 3 | ... | ... | ... | D56 |
| 4 | ... | ... | ... | D55 |
| 5 | ... | ... | ... | D54 |
| 6 | ... | ... | ... | D55 |
| 7 | ... | ... | ... | D54 |
| 8 | ... | ... | ... | D55 |
| 9 | ... | ... | ... | D54 |
| 10 | ... | ... | ... | D55 |
| 11 |  |  |  | D54 |
| 12 | ... | ... | ... | D56 |

| RUNTIME PARAMETER | DATA VAIUE | FIRST ROW | LAST ROW | TOTAL ROWS MATCHING PARAMETER | RRN BIT MAP |
|---|---|---|---|---|---|
| MGR_D54 | D54 | 1 | 23145 | 1349 | 100010101010... |
| MGR_D55 | D55 | 2 | 13245 | 3459 | 010101010100... |
| HR_DIR | DHR | 1 | 312789 | 292789 | 110111111110... |

FIG. 6

DATABASE ROW ACCESS CONTROL

CROSS-REFERENCE TO RELATED APPLICATIONS

This application is a continuation of co-pending U.S. patent application Ser. No. 13/687,538 filed Nov. 28, 2012. The aforementioned related patent application is herein incorporated by reference in its entirety.

FIELD

This disclosure generally relates to computing systems, and in particular, to processing database queries in a database management system.

BACKGROUND

Databases are used to store information for numerous types of applications. Examples include various industrial, commercial, technical, scientific, and educational applications. Database management systems (DBMSs) are a typical mechanism for accessing data stored in a database. DBMSs are typically configured to separate the process of storing data from accessing, manipulating, or using data stored in a database. More specifically, DBMSs use a model in which data is first stored and indexed in a memory before subsequent querying and analysis. Databases may contain large amounts of data, which may create performance issues when a user queries the database for specific information. In most cases, there may be groups of users accessing the database that can only access limited pieces of data. Controlling user access, however, may create performance issues when a user queries the database.

SUMMARY

Embodiments of the disclosure provide a method, system, and computer program product for processing a database query. The method, system, and computer program process a query using an access control bit mapping (ACBM) structure.

One embodiment is directed to a computer-implemented method to create an ACBM structure for a database table. The ACBM structure may include a relative record number (RRN) bit map. The RRN bit map may describe the access rights for a parameter. The computer-implemented method may determine one or more statistics describing the RRN bit map. The method may additionally provide for updating the ACBM structure. The ACBM structure may be used to process a database query.

Another embodiment is directed to a system including an ACBM structure corresponding to a database table. The system may include a database management system. The system may be configured to create an ACBM structure for a database table in a memory. The ACBM structure may include a relative record number (RRN) bit map describing access rights for a parameter. The system may be configured to determine one or more statistics describing the RRN bit map. The system may provide for updating the ACBM structure. The system may also provide for using the ACBM structure when processing a database query.

Yet another embodiment is directed to a computer program product.

BRIEF DESCRIPTION OF THE DRAWINGS

FIG. 4 illustrates a sample access control listing (ACL) with example data, according to some embodiments.

FIG. 5 illustrates a sample database table with example data, according to some embodiments.

FIG. 6 illustrates a sample ACBM structure with example data, according to some embodiments.

Like reference numbers and designations in the various drawings indicate like elements.

DETAILED DESCRIPTION

Row Access Control (RAC) may allow a database administrator to control a user's access to a row of a database table. RAC is the ability for the database administrator to define a set of permissions (or rules, typically using Structured Query Language (SQL)) that may conditionally disallow users to access rows of database tables. RAC, however, may have limitations. For example, after a permission is defined, even the database administrator may not have access to a particular row. The database administrator authority may only allow the database administrator to define which rows can be accessed dependent on the data or a runtime parameter, such as a user profile, not to actually access that data after the permissions have been defined.

A database may, for example, be used to manage the personnel information for a company. In such a database, the database administrator may limit a user's access. For example, a database administrator may define a permission such that the manager for Department 54 is only able to see information about the employees that are within Department 54. The manager for Department 54 may also not be able to access any information for personnel that are not a part of Department 54. Other permissions may be similarly defined. A permission may be defined by a database administrator using a runtime parameter, such as a username, and a data value, which may be a value corresponding to data within a table, which may be used for determining whether to permit access to a particular row.

A database management system (DBMS) may use permissions while executing a query to limit the rows that are added to the result set by eliminating the rows that a user cannot access. The DBMS may, for example, accomplish this by adding the data value corresponding to a particular runtime parameter as an additional constraint to the query, effectively searching for rows that both satisfy the user's query and are accessible to the user. Using this method of access control may adversely affect the performance of the query.

Embodiments disclosed herein are related to a method, system, and computer program product for processing a database query. Some embodiments may create a new database structure, referred to herein as an access control bit mapping (ACBM) structure. An ACBM structure may include information about the location of data within a particular database table based on the runtime parameters and corresponding data values defined by the permissions. Implementing an ACBM structure may, in some embodiments, limit the number of rows on which a query is run, thereby potentially improving the performance of the query.

Figure 1:
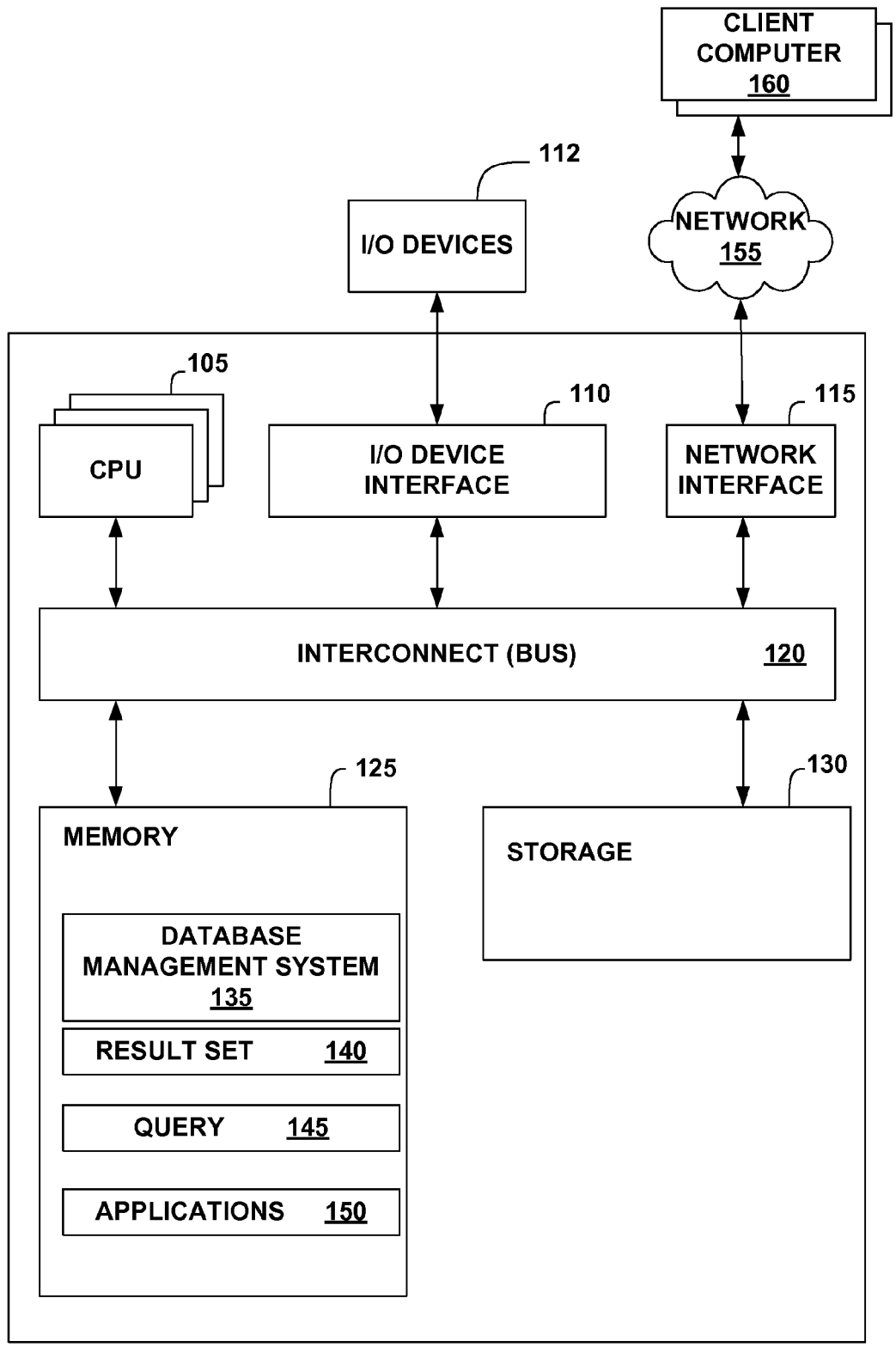
FIG. 1 illustrates a computer system configured to execute a database application, according to some embodiments.

FIG. 1 illustrates an example representation of a computer system 100 connected to one or more client computers 160 via a network 155, according to some embodiments. For the purposes of this disclosure, computer system 100 may represent practically any type of computer, computer system, or other programmable electronic device, including but not limited to, a client computer, a server computer, a portable computer, a handheld computer, an embedded controller, etc. In some embodiments, computer system 100 may be implemented using one or more networked computers, e.g., in a cluster or other distributed computing system.

The computer system 100 may include, without limitation, one or more processors (CPUs) 105, a network interface 115, an interconnect 120, a memory 125, and a storage 130. The computer system 100 may also include an I/O device interface 110 used to connect I/O devices 112, e.g., keyboard, display, and mouse devices, to the computer system 100.

Each processor 105 may retrieve and execute programming instructions stored in the memory 125 or storage 130. Similarly, the processor 105 may store and retrieve application data residing in the memory 125. The interconnect 120 may transmit programming instructions and application data between each processor 105, I/O device interface 110, network interface 115, memory 125, and storage 130. The interconnect 120 may be one or more busses. The processor 105 may be a single central processing unit (CPU), multiple CPUs, or a single CPU having multiple processing cores in various embodiments. In one embodiment, a processor 105 may be a digital signal processor (DSP).

The memory 125 may be representative of a random access memory, e.g., Static Random Access Memory (SRAM), Dynamic Random Access Memory (DRAM), read-only memory, or flash memory. The storage 130 may be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 115 may be configured to transmit data via the communications network 155.

The memory 125 may include a database management system (DBMS) 135, a result set 140, a query 145, and applications 150. Although these elements are illustrated as residing in the memory 125, any of the elements, or combinations thereof, may reside in the storage 130 or partially in the memory 125 and partially in the storage 130. Each of these elements will be described in greater detail in accordance with FIG. 2.

The network 155 may be any suitable network or combination of networks and may support any appropriate protocol suitable for communication of data and/or code to/from the server computer system 100 and the client computer system 160. In some embodiments, the network 155 may support wireless communications. In other embodiments, the network 155 may support hardwired communications. The network 155 may be the Internet and may support Internet Protocol in some embodiments. In other embodiments, the network 155 may be implemented as a local area network (LAN) or a wide area network (WAN). The network 155 may also be implemented as a cellular data network. Although the network 155 is shown as a single network in the figures, one or more networks of the same or different types may be included.

The client computer system 160 may include some or all of the hardware and software elements of the computer system 100 previously described. As shown, there may be one or more client computers 160 connected to the computer system 100 via the network 155. In some embodiments, one or more client computers 160 may send a query 145 by network 155 to computer system 100 and receive a result set 140.

Figure 2:
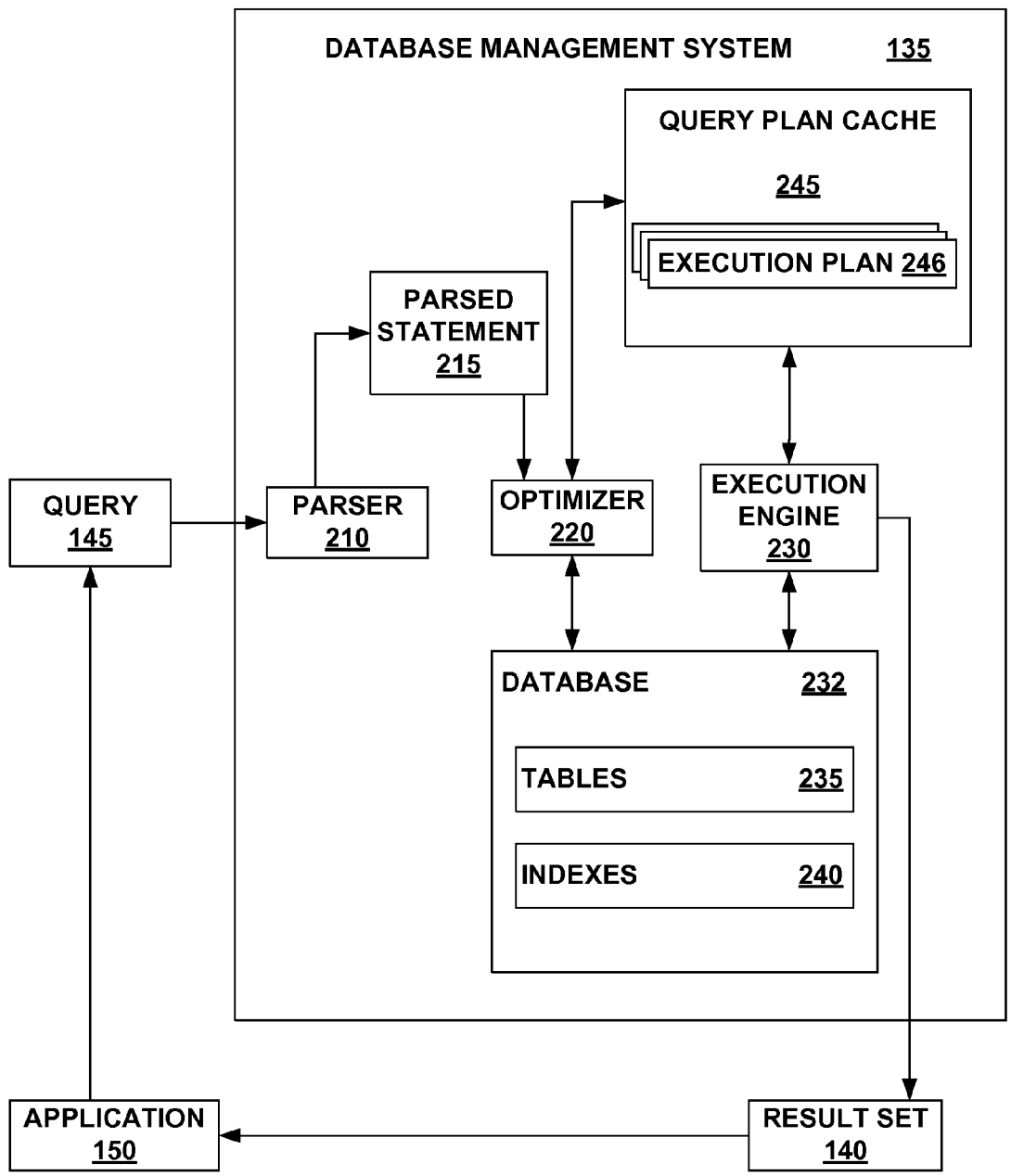
FIG. 2 illustrates a database management system (DBMS) that may be configured to include an access control bit mapping structure (ACBM), according to some embodiments.

FIG. 2 illustrates an example database management system (DBMS) 135 that may be configured with an access control bit map structure (ACBM), according to some embodiments. The DBMS 135 may include a parser 210, an optimizer 220, an execution engine 230, and a database 232. The parser 210 may receive a database query 145 from an application 150. In some embodiments, the database query 145 may be in the form of a Structured Query Language (SQL) statement. The parser 210 may generate a parsed statement 215. The parser 210 may send the parsed statement 215 to an optimizer 220. The optimizer 220 may attempt to optimize the parsed statement. In some embodiments, optimizing may improve the performance of the database query 145 by, for example, reducing the amount of time it takes to provide a user with a response. The optimizer 220 may generate an execution plan 246, which may be maintained in a query plan cache 245, according to some embodiments. The query plan cache 245 may include one or more execution plans 246, including the current execution plan as well as previously used execution plans. Once an execution plan 246 is generated, the execution plan 246 may be sent to the execution engine 230. The execution engine 230 may execute the query 145. Executing the query 145 may include finding and retrieving data in the database tables 235 that satisfies the criteria supplied in the query 145. The execution engine 230 may store the data returned matching the query 145 in a result set 140. The DBMS 135 may return the result set 140 to an application 150, such as the application in which the database query 145 was generated, as a response to the database query 145.

A database 232 may include one or more tables 235 and, in some embodiments, one or more indexes 240. A database table 235 may organize data into rows and columns. Each row of a database table 235 may correspond to an individual entry, a tuple, or a record in the database 232. A column may define what is stored in each entry, tuple, or record. In some embodiments, columns of a table 235 may also be referred to as fields or attributes. Each table 235 within the database 232 may have a unique name. Each column within a table 235 may also have a unique name. A row, tuple, or record, however, within a particular table 235 may not be unique, according to some embodiments. A database 232 may also include one or more indexes 240. An index 240 may be a data structure that may inform the DBMS 135 of the location of a particular record within a table 235 if given a particular indexed column value. In some embodiments, the execution engine 230 may use the one or more indexes 240 to locate data within a table 235. In other embodiments, the execution engine 230 may scan the tables 235 without using an index 240.

Figure 3:
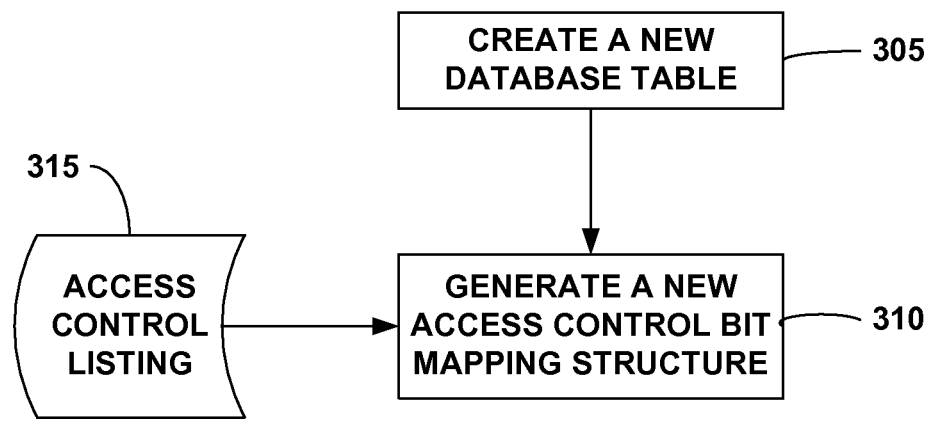
FIG. 3 illustrates a method to create an ACBM structure, according to some embodiments.

FIG. 3 is a flowchart illustrating a method 300 to create an access control bit mapping (ACBM) structure, according to some embodiments. The method 300 may begin with operation 305. At operation 305, a table may be created in a database, e.g., database 232 (FIG. 2). A user, operator, database administrator, or application, e.g., application 150, may create the table in the database 232. The table may, in some embodiments, be populated with data during its creation. In other embodiments, data may be inserted into the table separately from the creation of the table.

At operation 310, a DBMS, e.g., DBMS 150 (FIG. 1), may generate an ACBM structure upon creation of the database table in operation 305. An exemplary ACBM structure according to some embodiments will be described in further detail in accordance with FIGS. 4-6. In some embodiments, the ACBM structure may be a single index or a single database table. In other embodiments, the ACBM structure may be a plurality of indexes or a plurality of database tables. In yet other embodiments, the ACBM may be a combination of one or more indexes and one or more database tables. The ACBM structure may store information describing access rights obtained from the access control listing (ACL) 315 for particular rows of the corresponding database table. The access rights may be described for one or more runtime parameters. A runtime parameter, as referred to herein, may include any parameter on which a user's access to a row of a database table may be restricted. Runtime parameters may, for example, include: a user group or user type, location of a user, the IP address of a client computer, e.g., client computer 160, special register value, or any other variable that may be retrieved by the DBMS, e.g., a system variable or an environment variable.

FIG. 4 illustrates a sample access control listing (ACL) 400 for a database, e.g., database 232 (FIG. 2), with example data, according to some embodiments. An ACL, as referred to herein, may include permission rules defined by a database administrator that may define runtime parameter-specific access rights. The illustrated ACL 400 is shown as a single database table. The ACL 400 may, however, include multiple database tables in other embodiments. The illustrated ACL 400 includes three columns describing the access to rows within a particular table. In some embodiments, an ACL may have either fewer or additional columns as compared to the illustrated embodiment. The three columns, PARAMETER PERMISSION 405, RUNTIME PARAMETER 410, and DATA VALUE 415 include sample data as it may appear for a database that includes the personnel information for a company. The PARAMETER PERMISSION 405 column includes a permission identifier, such as D54 PERMISSION in row 420. The RUNTIME PARAMETER 410 in this embodiment is a user's login information, and the DATA VALUE 415 includes the value of the data that may appear in a database table. Existence of the DATA VALUE 415 may indicate that a user has access to the row containing that particular value. By way of the personnel management database example, this may include a row with an employee's information that belongs to Department 54 (an example of a database table and example data is included in the description in accordance with FIG. 5).

FIG. 5 illustrates a sample database table 500 for a database, e.g., database 232 (FIG. 2), with example data, according to some embodiments. The database table may be organized into rows, each of which represents individual entries, tuples, or records in the database 232, and columns, keys, fields, or attributes that define the organization or structure of the data values that are stored in each entry, tuple, or record. The database table 500 may include a plurality of columns, each column containing various types of information about the entry, tuple, or record. For example, the sample database table 500 may be a table containing personnel information and may include columns with information about each employee, such as, for example, an employee ID (EMP ID) 505, employee first name (EMP FNAME) 510, employee last name (EMP LNAME) 515, employee start date (START DATE) 520, and a parameter column (PARAMETER) 525. The PARAMETER 525 column may be used to determine whether a database user may access an individual row. For example, according to the user permissions previously described in accordance with FIG. 4, a manager in Department 54 may be able to access rows containing employee details where the PARAMETER 525 column contains the value "D54." This may allow the manager in Department 54 to access the rows containing information for employee IDs 1, 5, 9, and 11.

FIG. 6 illustrates a sample access control bit map (ACBM) structure 600 for a database, e.g., database 232 (FIG. 2), with example data, according to some embodiments. The ACBM structure 600 may be a single database table, a single index, a plurality of database tables, a plurality of indexes, a combination thereof, or any suitable database structure, according to various embodiments. For simplicity of this description and the claims that follow, the ACBM structure 600 will be referred to herein as a single database table. The ACBM structure 600 may be organized into rows, each of which represent individual entries, tuples, or records in the database, and columns, keys, fields, or attributes that define the organization or structure of the data values that are stored in each entry, tuple, or record. The ACBM structure 600 may include a plurality of columns, each column containing various types of information about the access rights for rows in the database table corresponding to a particular parameter, according to some embodiments. For example, the ACBM structure 600 may include columns for a RUNTIME PARAMETER 605, a DATA VALUE 625, a FIRST ROW 615 number, a LAST ROW 620 number, a TOTAL ROWS MATCHING PARAMETER 625 number, and an RRN BIT MAP 630.

The ACBM structure 600 may be populated based on data in the ACL 400 and the corresponding database table 500. For example, the ACL 400 data may be represented in columns 605 and 610 of the ACBM structure 600. The remaining columns 615-630 may contain information based on the data in database table 500 combined with the particular permissions listed in columns 605 and 610.

Figure 7:
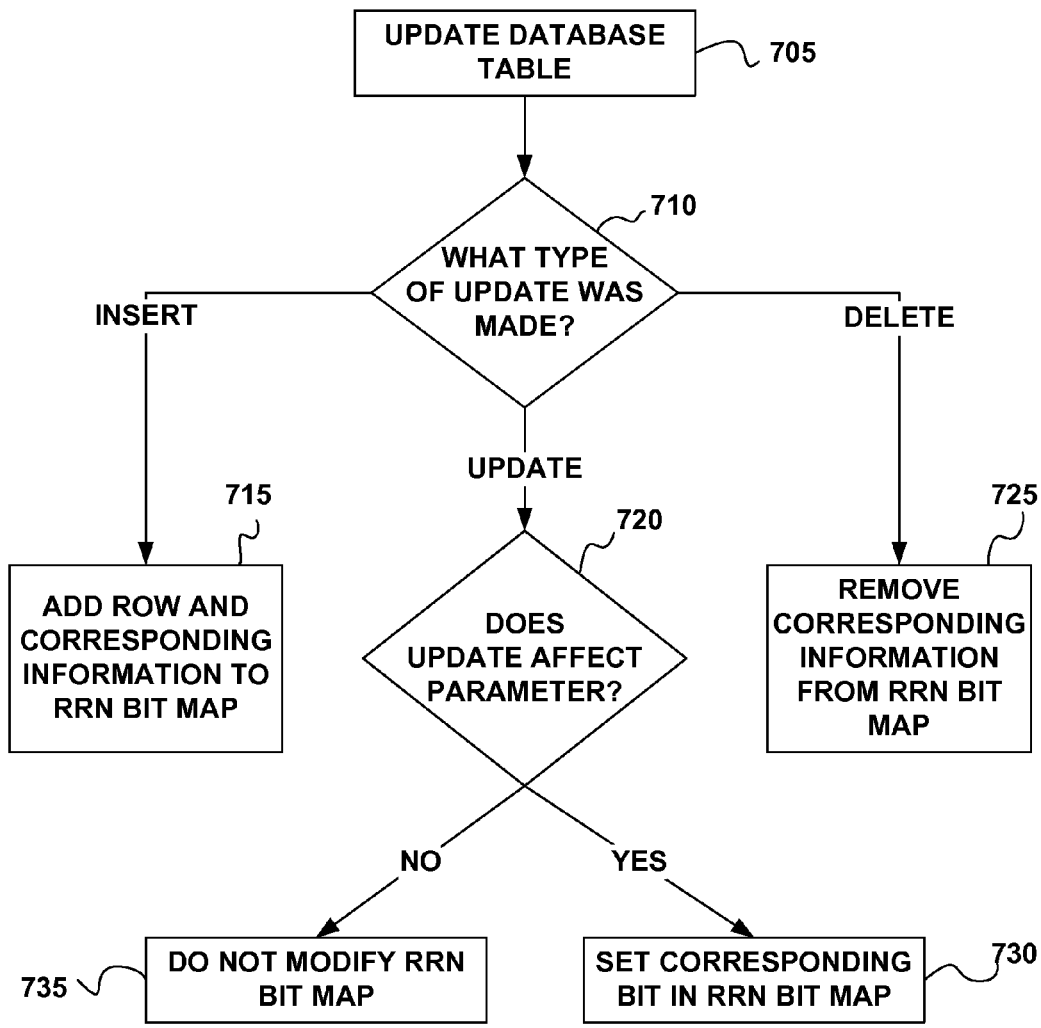
FIG. 7 illustrates a method to modify an ACBM structure upon modification to a corresponding database table, according to some embodiments.

FIG. 7 is a flowchart illustrating a method 700 to modify an ACBM structure, e.g., ACBM structure 600 (FIG. 6), upon a modification to a corresponding database table, e.g., table 500 (FIG. 5), according to some embodiments. A modification to a database table may affect the corresponding ACBM structure and therefore may require updating. The updating of the ACBM structure may be dependent upon the type of modification made to the corresponding database table. A modification to a database table, as used herein, may refer to an insert, update, or delete operation on the table.

The method 700 may begin at operation 705 upon a modification to a database table, e.g., database table 500 (FIG. 5). A modification to a database table may include adding one or more rows to the database table, deleting one or more rows from the database table, or modifying one or more values of one or more rows within the database table. The type of modification may control whether and how the ACBM structure may be updated. At operation 710, the DBMS 135 may determine the type of modification was made to a database table. Accordingly, the DBMS 135 may take different actions.

If the DBMS determines at operation 710 that one or more rows were inserted into the database table, the DBMS may determine that operation 715 may need to modify the corresponding ACBM structure. Modifying the corresponding ACBM structure may include modifying the RRN bit maps included in the ACBM structure and may also include modifying the statistics in the corresponding ACBM structure. Updating the RRN bit maps in operation 715 may include appending the bit value to the RRN bit map in the ACBM structure. The RRN bit map may contain the same number of bit values as the number of rows in the corresponding database table.

If the DBMS determines at operation 710 that one or more rows were updated in the database table, the DBMS may determine at operation 720 whether that modification impacts the RRN bit map. An example of a modification to the database table that may impact the RRN bit map includes modifying the value in the parameter column of the database table. Modifying the value in the parameter column may change the access rights for the particular row or rows that was/were modified. If the DBMS determines that the parameter column of the database table was not modified, then the DBMS may take no additional action. However, if the DBMS determines that the parameter column of the database table was modified, the DBMS may set the corresponding bits in the affected RRN bit maps. Setting the corresponding bit in the affected RRN bit maps may include setting the bit for the parameter that was removed and also setting the bit for the parameter value that was added.

If the DBMS determines at operation 710 that one or more rows was deleted from the database table, the DBMS may determine that operation 725 may need to modify the corresponding ACBM structure. Modifying the corresponding ACBM structure may include modifying the RRN bit maps included in the ACBM structure and may also include modifying the statistics in the corresponding ACBM structure. Updating the RRN bit maps in operation 725 may include deleting the bit value in the RRN bit maps included in the ACBM structure. The RRN bit map may contain the same number of bit values as the number of rows in the corresponding database table following the delete operation.

Figure 8:
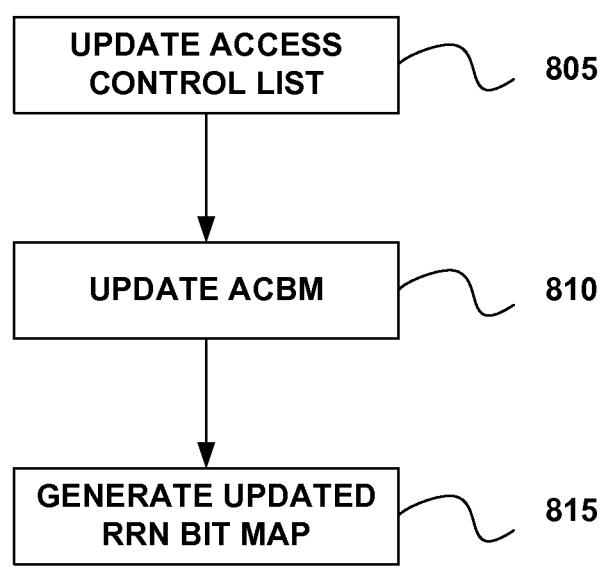
FIG. 8 illustrates a method to modify an ACBM structure upon modification to an ACL, according to some embodiments.

FIG. 8 is a flowchart illustrating a method 800 to modify an ACBM structure, e.g., ACBM structure 600 (FIG. 6), upon the modification of an access control listing, e.g., ACL 400 (FIG. 4), according to some embodiments. A modification to the ACL 400 may affect the ACBM structure corresponding to a database table in some embodiments. The method 800 may begin at operation 805 upon a modification to the ACL 400 for a particular database. The modification to the ACL may include inserting a new permission rule, deleting an existing permission rule, or modifying an existing permission rule. At operation 810, the DBMS will determine what type of modification was made to the ACL 400. The determination in operation 810 may define the action the DBMS will take to modify the ACBM structures in the database.

At operation 815, the DBMS may have determined that a new permission rule was inserted into the ACL. The DBMS may add a new row to the ACBM structures that exist at that point within the database. At operation 820, the DBMS may determine that an existing permission rule was deleted from the ACL. The DBMS may delete the corresponding row from the ACBM structures that exist within the database. At operation 825 the DBMS may determine that an existing permission within the ACL was modified. The DBMS may modify the corresponding ACBM structures that exist within the database and may regenerate the corresponding RRN bit maps.

Figure 9:
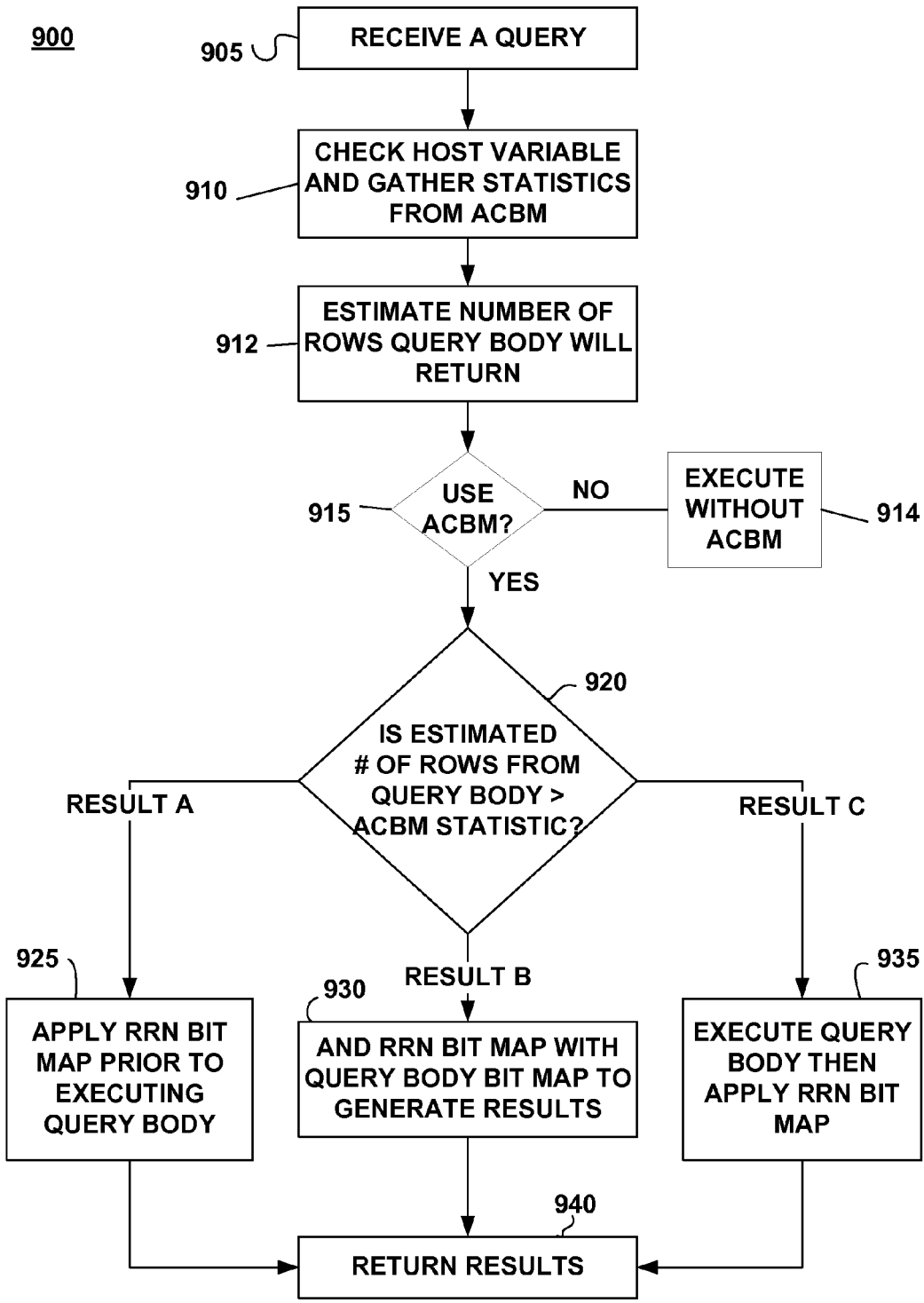
FIG. 9 illustrates a method to process a database query, according to some embodiments.

FIG. 9 is a flowchart illustrating a method 900 to process a database query, according to some embodiments. The method 900 may process a query using an ACBM structure, e.g., ACBM structure 600 (FIG. 6). The method 900 may begin at operation 905 when a query, e.g., query 145 (FIG. 2), is received by a query optimizer, e.g., optimizer 220 (FIG. 2). In some embodiments, the query 145 may only be querying one database table. In other embodiments, the query 145 may be querying more than one table. At operation 910, the optimizer 220 may determine the value of the runtime parameter. The value of the runtime parameter may be determined, for example, with a user-defined function, system-defined function, DBMS value, special register lookup, or other suitable means. At operation 910, the optimizer 220 may also gather statistics from the ACBM structure 600. These statistics may provide a count of the number of rows that may be accessible for the particular query 145 based on the access permissions of the user, without looking at the underlying data. At operation 912, the optimizer 220 may estimate the number of rows that the query body will return. This estimate may be made without consideration of which rows a user may access. Otherwise, the query optimizer may process the query 145 as normal.

At operation 915, the optimizer 220 may attempt to determine whether applying the ACBM structure to the query may result in improved efficiency of the query 145. In some embodiments, this determination may result in the optimizer 220 executing the query 145 without applying the ACBM structure 600. The optimizer 220 may, for example, determine that the efficiency of the query 145 may not be improved by using the ACBM structure. In some embodiments, this determination may be based on various conditions that relate to either hardware constraints or the data itself. For example, if the data sought by the query 145 is clustered, the performance improvement may be minimal. Other examples include a database table which has a limited number of rows, or a runtime parameter for which a majority of rows of the database table are accessible. In other embodiments, the query performance may not be improved based on hardware constraints of the system. Hardware constraints may, for example, be the number of processors, the number of disk drives, the capacity of the processors, the capacity of the disk drives, the amount of memory, etc.

At operation 920, the number of rows returned at operation 910 may be compared to the number of rows estimated at operation 912. This comparison may determine how the optimizer 220 may process the query 145. As illustrated in FIG. 9, there may be three different results from the comparison of these two values: Result A, Result B, or Result C. Each of these results may correspond to the optimizer 220 executing the database query 145 in a different manner.

If the comparison of operation 920 returns Result A, then the estimated number of rows from the query body may have been estimated to be significantly greater than the number of applicable rows based on the ACBM statistics. Accordingly, at operation 925 the query may be run more efficiently if the RRN bit map is used to eliminate rows where the user does not have access to the data. This may, for example, reduce the number of rows upon which the query 145 is run, thereby reducing the amount of time the query 145 may run. The result set 140 may be returned at operation 940.

If the comparison of operation 920 returns Result B, then the estimated number of rows from the query body may be neither significantly greater nor significantly lesser than the number of applicable rows based on the ACBM statistics. In some embodiments, this may mean that the comparison resulted in the same number of potential rows. In other embodiments, the number of rows may be slightly greater or slightly lesser. In these borderline cases, it may not be clear which method will result in increased query performance. Accordingly, at operation 930, the optimizer 220 may perform a logical AND operation on the RRN bit map with the query result bit map, and use the resulting bit map to generate the result set 140. The result set 140 may be returned by operation 940.

If the comparison of operation 920 returns Result C, then the estimated number of rows from the query body may have been estimated to be significantly less than the number of applicable rows based on the ACBM statistics. Accordingly, at operation 935 the optimizer 220 may process the query body prior to eliminating rows using the RRN bit map. This may, for example, improve the efficiency of the query because the query body will be run on a smaller number of potential rows than are accessible to the user. The query results may be returned at operation 940.

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination thereof. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination thereof. In the context of this disclosure, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination thereof.

Computer program code for carrying out operations for aspects of the present disclosure may be written in any combination of one or more programming languages, including: an object oriented programming language such as Java, Smalltalk, C++, or the like; and conventional procedural programming languages, such as the "C" programming language or similar programming languages. The program code may execute as specifically described herein. In addition, the program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure have been described with reference to flowchart illustrations, block diagrams, or both, of methods, apparatuses (systems), and computer program products according to embodiments of this disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions or acts specified in the flowchart or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

While the foregoing is directed to exemplary embodiments, other and further embodiments of the invention may be devised without departing from the basic scope thereof, and the scope thereof is determined by the claims that follow.

What is claimed is:

1. A system comprising:
one or more processors; and
program code including a query optimizer, the program code configured to be executed by the one or more processors to process a database query, the program code configured to:
create an access control bit mapping (ACBM) structure for a database table in a memory, the database table having a number of database rows, each database row including an access control field value selected from a plurality of candidate access control field values, the access control field value designating access rights to the database row, the ACBM structure having a number of entries, each entry including a parameter field value designating the access rights associated with at least one of the plurality of candidate access control field values, each entry further including a relative record number (RRN) bit map, the RRN bit map having a number of bits corresponding to the number of database rows in the database table, each bit indicating whether the parameter field value designates the access rights determined by the access control field value of the corresponding database row, wherein the parameter field value of a first entry in the ACBM structure designates first access rights, wherein a target number of database rows are accessible under the first access rights, and wherein the target number of bits in the RRN bit map of the first entry identifies the corresponding accessible database rows;
determine one or more statistics from the RRN bit map, wherein the one or more statistics correspond to accessible rows of the database table associated with the parameter field value; and
update the ACBM structure in response to determining that the database table has been modified, the update including modifying the RRN bit map of at least one entry.

2. The system of claim 1, wherein the ACBM structure includes one or more indexes.

3. The system of claim 1, wherein the ACBM structure includes one or more database tables.

4. The system of claim 1, wherein the access rights designated by the parameter field value are obtained from an access control listing (ACL) associated with the database table.

5. The system of claim 4, wherein the ACL includes the parameter field value and the candidate access control field values associated with the access rights designated by the parameter field value.

6. The system of claim 1, wherein the modifying the RRN bit map includes setting a bit within the RRN bit map corresponding to an individual row of the database table.

7. The system of claim 1, wherein the updating the ACBM structure further comprises updating the one or more statistics of an ACBM structure entry.

8. The system of claim 1, wherein the one or more statistics of an ACBM structure entry include a count of accessible database rows, the access rights determined by the access control field value of each database row represented by the count also designated by the parameter field value of the ACBM structure entry.

9. The system of claim 1, wherein the determining one or more statistics includes establishing and updating the one or more statistics.

10. A computer program product for processing a database query, the computer program product comprising a non-transitory computer readable storage medium having program code embodied therewith, the program code comprising computer readable program code configured to:
create an access control bit mapping (ACBM) structure for a database table in a memory, the database table having a number of database rows, each database row including an access control field value selected from a plurality of candidate access control field values, the access control field value designating access rights to the database row, the ACBM structure having a number of entries, each entry including a parameter field value designating the access rights associated with at least one of the plurality of candidate access control field values, each entry further including a relative record number (RRN) bit map, the RRN bit map having a number of bits corresponding to the number of database rows in the database table, each bit indicating whether the parameter field value designates the access rights determined by the access control field value of the corresponding database row, wherein the parameter field value of a first entry in the ACBM structure designates first access rights, wherein a target number of database rows are accessible under the first access rights, and wherein the target number of bits in the RRN bit map of the first entry identifies the corresponding accessible database rows;

determine one or more statistics from the RRN bit map, wherein the one or more statistics correspond to accessible rows of the database table associated with the parameter field value; and update the ACBM structure in response to determining that the database table has been modified, the update including modifying the RRN bit map of at least one entry.

11. The computer program product of claim 10, wherein the ACBM structure includes one or more indexes.

12. The computer program product of claim 10, wherein the ACBM structure includes one or more database tables.

13. The computer program product of claim 10, wherein the computer readable program code is further configured to:

receive a database query targeting the database table; and execute the database query using the ACBM structure created for the database table, wherein the executing the database query includes using a query optimizer.

14. The computer program product of claim 13, wherein the executing the database query further comprises:

determining the access rights associated with the initiator of the database query;

identifying the entry in the ACBM structure having the parameter field value designating the access rights associated with initiator of the database query;

determining an access count, wherein the access count is a count of accessible rows in the database table being queried, the determining including using the one or more statistics associated with the identified entry;

estimating a search count, wherein the search count is an estimated count of rows which the database query will return independent of the access rights associated with the initiator of the database query; and comparing the search count and the access count.

15. The computer program product of claim 14, wherein the executing the database query further comprises:

executing the query on the accessible rows described by the RRN bit map.

16. The computer program product of claim 14, wherein the executing the database query further comprises:

eliminating rows from a result set using the RRN bit map, wherein eliminating removes rows for which the RRN bit map indicates the row is not accessible.

17. The computer program product of claim 14, wherein the executing the database query further comprises:

performing a logical AND operation on a query result bit map and the RRN bit map.

18. The computer program product of claim 10, wherein the parameter field value is at least one of:

a special register value;

an environment variable value; and a system variable value.

19. The computer program product of claim 10, wherein the parameter field value is determined by at least one of:

an IP address;

a user-defined function;

a system-defined function;

a DBMS value;

a special register lookup;

a column value; and a session attribute.

* * * * *